United States Patent [19]

Zebuhr

[11] 4,144,999
[45] Mar. 20, 1979

[54] SYSTEM AND STRUCTURE FOR CONDITIONING AIR

[75] Inventor: William H. Zebuhr, Nashua, N.H.

[73] Assignee: Sunhouse, Incorporated, Nashua, N.H.

[21] Appl. No.: 742,346

[22] Filed: Nov. 16, 1976

[51] Int. Cl.² .................................................. F24J 3/02
[52] U.S. Cl. .................................... 237/1 A; 126/271; 126/400; 219/314; 219/365
[58] Field of Search ....................... 126/270, 400, 271; 237/1 A; 62/2; 165/122, 124, 135, 64, 169, 127, 128, DIG. 4; 98/31; 219/341, 365

[56] References Cited

U.S. PATENT DOCUMENTS

| | | | |
|---|---|---|---|
| 1,221,106 | 4/1917 | Stransky | 219/314 |
| 2,022,812 | 12/1935 | Roe | 219/365 |
| 2,115,601 | 4/1938 | Whitby et al. | 219/314 |
| 2,438,834 | 3/1948 | Wartes | 219/365 |
| 2,715,177 | 8/1955 | Pfingsten | 219/365 |
| 3,812,903 | 5/1974 | Thomason | 126/400 |
| 4,021,895 | 5/1977 | Morse et al. | 237/1 A |
| 4,044,754 | 8/1977 | Cronin et al. | 126/271 |
| 4,061,132 | 12/1977 | Ashton et al. | 126/271 |

*Primary Examiner*—Henry C. Yuen
*Attorney, Agent, or Firm*—Albert Gordon

[57] ABSTRACT

A system for storing in a liquid storage medium a substantial part of the heat for a building. The liquid is contained within a large, vertical, cylindrical tank and is circulated to heat-receiving, or solar heated, structures and back to the tank. The stored heat is transferred to the building by forcing air through a limited passageway of which the cylindrical wall of the tank forms at least a major part. The tank wall thus becomes a major heat-exchanger. The air to be heated flows from a cooler to a warmer part of the tank surface and is then ducted throughout the building. The space within the tank is divided by an internal, heat-insulating, submersible barrier into a smaller, upper section in a larger, lower section. A hot water tank is suspended in the upper section, and the liquid in the upper section is maintained hotter than in the lower section, by additional solar panels, if necessary. The evaporator of a heat pump may be immersed in the lower section to facilitate transfer of heat to the forced air system even when the liquid in the lower section is not sufficiently hot to heat the air by direct contact between the air and the tank wall. The heat pump can also act as an air conditioner in the hot weather. Duct dampers and controls direct the air flow to provide temperature and humidity control under all conditions of solar heat supply or air conditioning. The building may be firmly connected to and preferably constructed around the tank to anchor the building solidly in place against winds of normally dangerous force.

13 Claims, 18 Drawing Figures

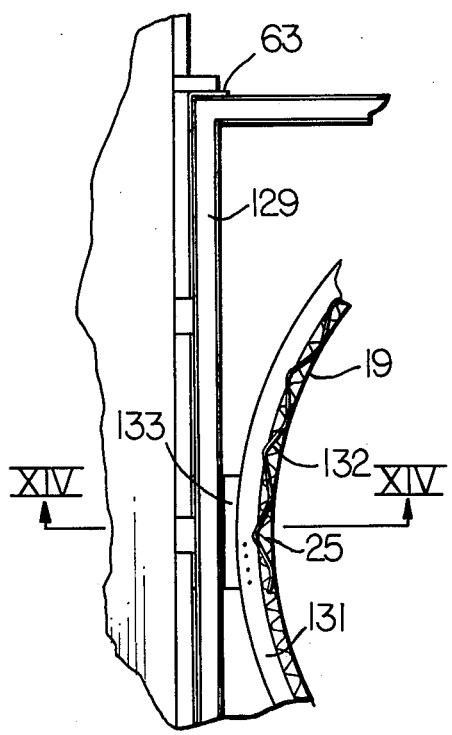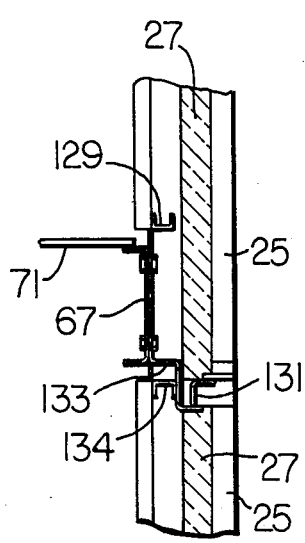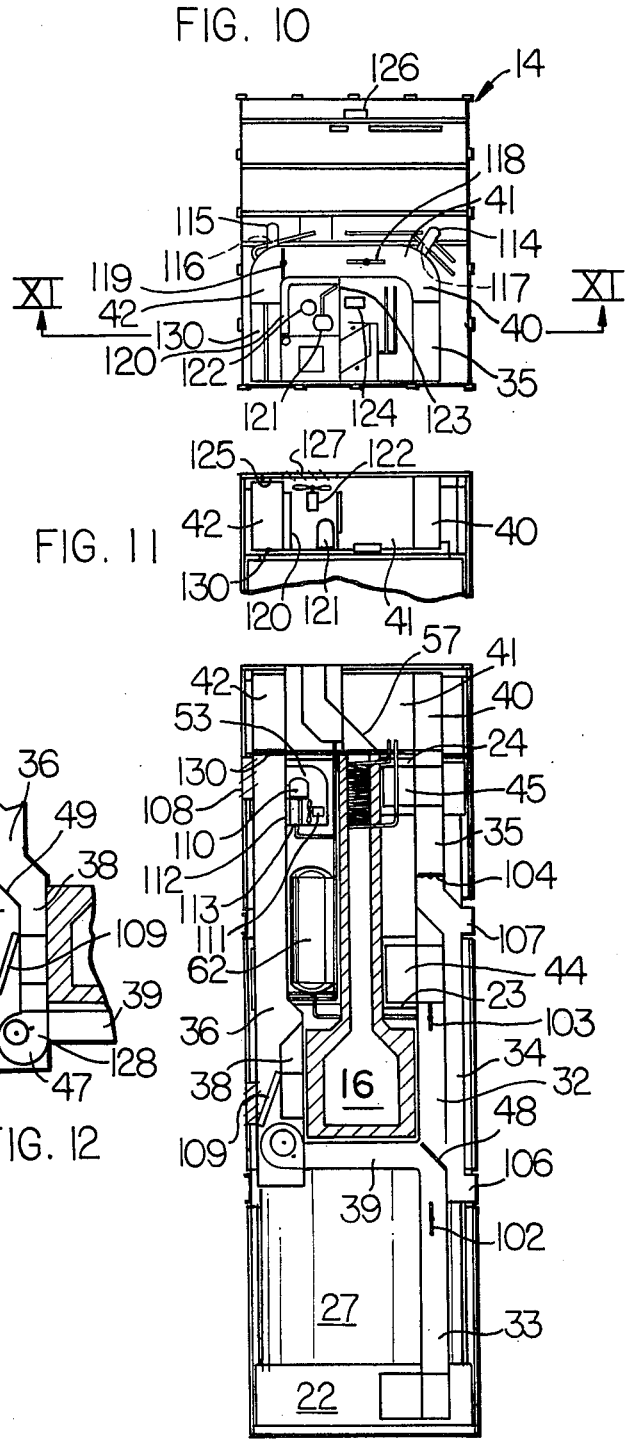

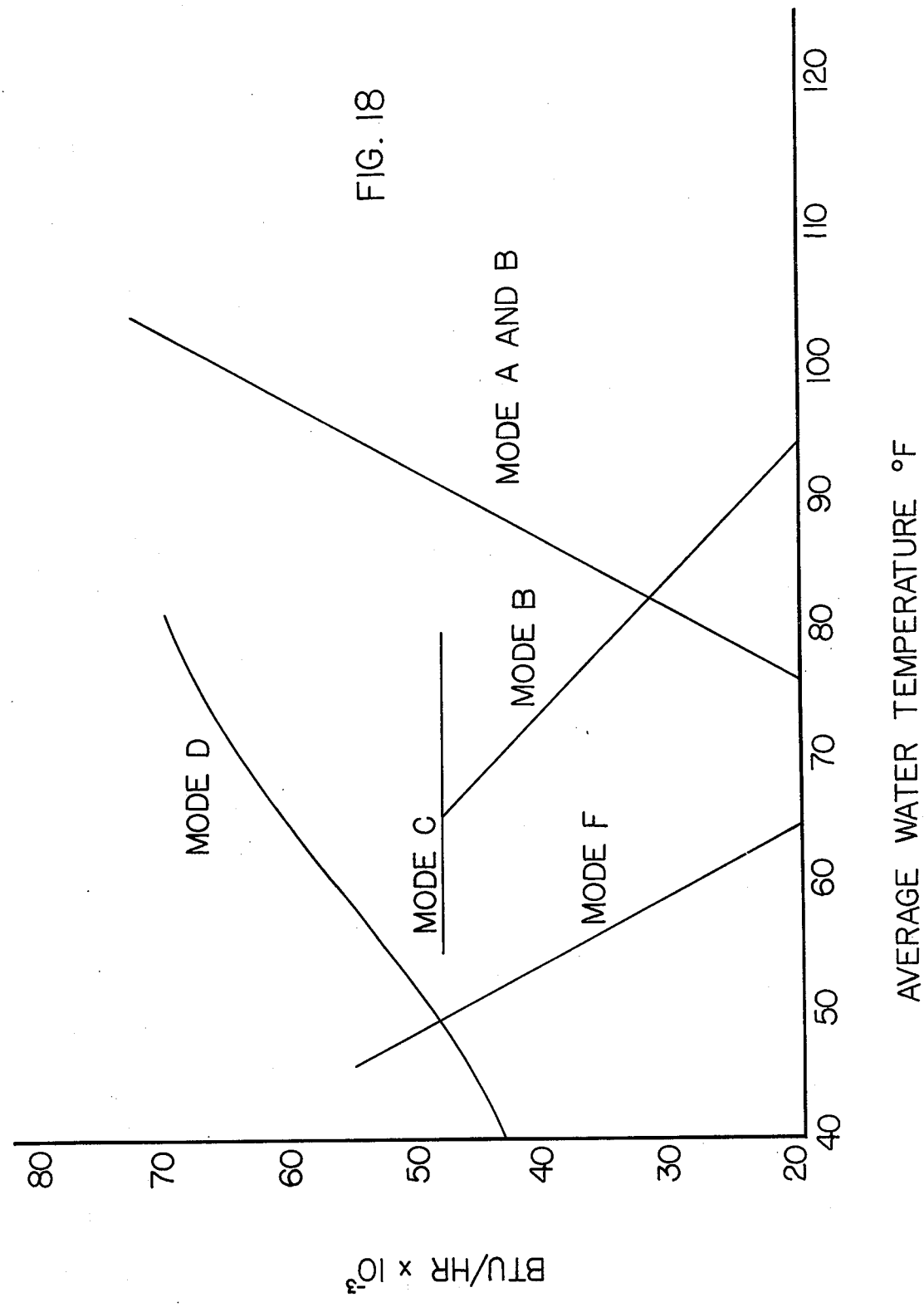

SYSTEM AND STRUCTURE FOR CONDITIONING AIR

BACKGROUND OF THE INVENTION

1. Field of the Invention

This invention relates to the field of buildings heated substantially entirely by solar energy and particularly to a structure that serves as a core for a solar heated building and includes a vertical tank that stores solar heated liquid to heat both the domestic hot water and the space in the building and as a heat source or heat sink for a heat pump to increase the efficiency of the heat pump for heating or cooling the building. In addition, the invention relates to an improved building in which the core is connected to the structure of the building to enable the building to withstand very high wind forces.

2. The Prior Art

A typical solar heating system includes a number of solar panels exposed to the sun. Each panel includes at least one hollow passageway through which a heat transfer medium flows, and this passageway is connected to a storage chamber to store the heat in a storage medium. Two types of heat transfer media have been given wide publicity: air and liquid. The liquid is usually water. If air is the transfer medium, the storage medium is usually gravel or rocks in a walled-off section of the basement of the building. If the transfer medium is liquid, either than same liquid may be piped into a storage tank so that the transfer medium will be the same as the storage medium, or a separate liquid may be used as the storage medium. The storage medium is contained in some available location, sometimes below ground and sometimes within an above-ground part of the building.

Extraction of heat from the storage medium may be accomplished, in the case of a liquid medium, by pumping the heated liquid from the storage container through radiators in the building to be heated. In the case of a gravel heat-retaining medium, air may be blown through the heated gravel and into a forced hot air system that distributes the heated air throughout the structure.

Although the use of gravel or rocks as a storage medium had frequently been suggested, it is unsatisfactory for several reasons. It requires substantially greater pumping power to pump air through the solar panels and the gravel storage medium than to pump liquid through suitable solar panels and the storage tank. The air solar panels are less efficient at transferring heat than are liquid solar panels because of the greater tendency for air to form a heat-insulating film on the air solar panels than for liquid to form a heat-insulating film in the pipes in a liquid solar panel. Moreover, ordinary bank-run gravel cannot be used. Crushed stone of a type not available in all areas is normally used. It is mandatory to wash the gravel when it is put into the storage container, and it may take tens of thousands of gallons of water simply to wash the dust off a few tons of gravel. If this is not done, the normal dust associated with gravel will eventually be circulated throughout the building and will be most objectionable.

There are other disadvantages not necessarily inherent with gravel itself but which commonly greatly reduce the efficiency of the air-heated gravel system. Once such disadvantage is that if the gravel is in a walled-off section of the basement of the building to be heated, it reduces the available space in the basement. The heated gravel also radiates heat that is likely to make the remainder of the basement unusable for other purposes.

A more serious, but very common, mistake in existing solar heating systems is to store the heat storage medium completely underground. This is not done so often in the case of gravel but is quite common in the case of a liquid heat storage medium. Even if the storage tank is well insulated, there is still a substantial heat loss to the ground, which is not in the least beneficial to the structure to be heated. It means that more heat will have to be extracted by the panels, which will therefore have to be larger, and that the volume of the storage tank will also have to be larger to make up for the heat that is lost.

In a solar heating system, the surface area of the panels in which the heat is captured are usually located on a sloping roof that faces in the direction of the sun, particularly the direction most favorable to receive sunlight in the wintertime when the greatest amount of solar heat is desired. The necessity for southerly orientation of the panels is universally understood, but a surprisingly common fault of existing solar heated structures is the use of panels that are too small. While this is not an inherent defect in existing solar heated structures, it is a very common one.

A more nearly inherent defect in existing structures is the failure to recognize that heat losses occur with the transfer of heat across a barrier. Frequently, solar heated structures are arranged so that the liquid heated by solar radiation in the panels transfers heat to a different liquid retained in the storage container. This allows a relatively small quantity of liquid to be exposed to solar radiation, and that small quantity can be specially treated to prevent the growth of algae or to include anti-freeze that might be deleterious to other parts of the system, but it necessitates an additional heat exchanger through which all heat must pass in order to reach the storage medium, and this additional heat exchanger reduces the overall heat transfer efficiency of the system. Preferably, the same liquid should pass through the panels and into the storage container to eliminate the necessity of the additional heat exchange barrier.

It has also been proposed in the past to pump liquid from the storage container through a hot water radiator system in the structure to be heated and to allow the normal radiators, or convectors, to disburse heat within the structure. However, the hot water in a convector must heat the air in contact with the convector vanes enough to reduce its density substantially. The less dense, heated air will then float out of the convector and be replaced by cooler, more dense air. This process requires that the water in a standard convector be much hotter than 100° F., for example about 180° F., which makes it inefficient to use hot water radiators or convectors in a solar heated building.

Even in the case of solar heating systems that use forced air to distribute heat from the storage medium to the rest of the building, it has been proposed in the past to provide additional heat by an electric heater in the forced air ducts at the time the extra heat is needed, if the amount of heat that is stored in the storage medium decreases too far. This is undesirable because, in most areas of the country, electric heat is about the most expensive source of heat per BTU. It is additionally undesirable to distribute such heat directly to the building means rather than to the storage medium because the time that one user is likely to be drawing on the electric public utility supply to furnish the power to produce this heat is the same time others are doing so, which would necessitate construction of excessive peak power capability by the utility if there were many such customers. Public utilities in some sections of the country have already proposed to charge owners of solar heated houses an extra amount for this very reason.

A further disadvantage in existing solar heated structures is that, in addition to their inefficiencies, their heat storage capacity is inadequate to carry them through extended periods of extremely cold weather in which the sun is hidden behind dense clouds. The assertions made in this respect on behalf of some existing system will not stand careful, mathematical analysis or actual experimentation.

At the present time only a relatively small number of solar heated houses have been built as such from their inception; more commonly pre-existing structures have been converted as well as possible to derive at least part of their heating needs from solar heat. However, in none of the cases of either new or old structures has the storage structure, itself, been used as a part of the building structure in such a way as to strengthen the building. Single family frame houses, in particular, are not highly resistant to wind forces developed in hurricanes or even heavy gales. Even when the structure itself is strong enough to remain in one piece, it is likely not to be securely anchored to the foundation, and it frequently happens that houses in an area swept by a hurricane may be entirely displaced from their foundations and moved some distance away without actually being destroyed. A gravel storage bin in the basement or an underground solar heated water tank or even a tank entirely supported at an elevated part of the structure is of absolutely no use in anchoring the structure to its foundation.

SUMMARY OF THE INVENTION

The invention will be described as applied to a single family house although the concept can be used in a multi-family house, an apartment house, a commercial building, or even in a multi-story building.

The main problem in heating a house with solar energy using existing technology is to be cost effective. The present invention uses a relatively large core structure built around a vertical water tank in which the heated water is stored. Although this structure in itself is likely to be one of the more costly items of the house, it eliminates the need for a furnace and thus saves some of its cost in that way. The core structure is suitable for construction in a factory rather than at the site as is common in the home building industry, and this centralized production makes it possible to include the basic part of a fireplace and much of the basic plumbing and wiring, thereby further reducing costs associated with the construction of a normal house that does not include the present invention. As a result, a house may be built using the features of this invention at a total cost that may not greatly exceed the cost of a non-solar heated house of the same general floor area and layout. As the advantages of centralized mass production of the core are realized, the total price of a solar heated house made according to the present invention may even become less than the price of an equivalent standard house. And in any case, the saving in fuel will, within a short time, make up for any excess cost.

Furthermore, the construction facilitates making the house a completely climate-controlled building with air conditioning and dehumidifying for the summer and with good humidification, as well as ample heat, during the winter. The air conditioning and dehumidifying machines are not only easier and cheaper to install in a centralized factory, but the arrangement of these components with the basic core makes them far more efficient and thus less costly to use than present day air conditioners and dehumidifiers in existing houses.

Although the basic structure with which this invention is involved is referred to as a core, it is not to be construed as necessarily located at the center of the house. There is a considerable advantage in doing so however, since it facilitates the use of the centralized plumbing and wiring mentioned previously. Furthermore, locating the core substantially at the center of the house allows its additional strengthening effect to be distributed evenly to all parts of the house.

As previously stated, the central item is a vertical tank standing on one end. Surrounding the tank is an enclosure of heat insulating material in the form of fiberglass, or the like. The innermost surface of this heat insulating material is not directly in contact with the outer wall of the tank but is spaced from it by perhaps an inch or so to provide an air space between the insulation and the wall of the tank. At least two circumferential ducts extend at least part way around the tank at spaced locations, preferably approximately one floor apart. These ducts communicate with the air space between the insulation and the wall of the tank, and air is gathered in one or the other of the ducts and allowed to flow through the air space so as to exchange heat witht the liquid contained therein. Then the air thus modified flows into the other duct.

Within the tank is a barrier that separates the tank into an upper and lower section. The lower section is normally substantially larger than the upper section, and the water in the lower section is the water used to heat the house. The water in the upper section is maintained at a higher temperature, and a hot water tank is immersed in the upper section to derive heat directly from the relatively high temperature water in that section. Typically the tank is about seven feet in diameter and about 20 feet long, although other sizes can be used according to the requirements of the building and the climate. It is enclosed within a cagelike structure that also encloses a central duct system to exchange air with the circumferential ducts and with other parts of the core. The cagelike structure also encloses a heat pump and a dehumidifier and the necessary dampers and heat exchangers to allow operation of the system in several different modes from severe winter operation to hot summer temperatures. It usually also includes a basic fireplace structure. When the large tank is filled with water, the water alone weighs about 48,000 pounds, but when the tank is empty, the total weight of the tank and the surrounding structure is between approximately 5,000 and 10,000 pounds, depending on how much equipment is associated with it.

It is not necessary to provide a full basement or a large floor on which to erect the tank; all that is needed is a concrete pad about ten feet by twelve feet. The perimeter of the bottom of the tank is bolted to the pad by bolts which provide sufficient strength to make it almost impossible to overturn the tank filled with water. In fact, the inherent strength of the tank is such that it is quite easy to provide a sufficiently strong connection between the tank and the pad so that if the pad could be turned up on edge, the tank could extend perpendicularly therefrom and with its axis horizontal. This degree of strength of the tank and in the attachment between the tank and the pad is such that a wind force of over 120 miles per hour would be required to move a house built around and attached to the tank as a core structure.

It is quite common, especially in modern houses, to see a fireplace constructed as part of the outer wall of the house with most of the volume of the fireplace actually outside the perimeter of the house. Such a fireplace not only is not likely to contribute substantially to heating the house, but is very likely to extract heat from the house. In the core structure of the present invention, it is a simple matter to provide a basic fireplace as part of the structure. This fireplace would then be located on an interior wall of the house, and any heat lost from it or from the chimney would be propagated inside the house rather than outside. Of course, some heat would still go out the top of the chimney, but about 60% or 70% can be captured by the heat retention structures of this invention. A simple heat exchange coil is located near the upper end of the chimney but in a region where there is still sufficient heat to raise the temperature of water in the heat exchanger. The heat exchanger coil is connected to the tank so that the water in the heat exchanger is obtained directly from the tank, and the heat added to that water is directed back into the tank itself.

Normally it is quite expensive to install a fireplace in a house, but by taking advantage of the factory construction the fireplace may be included with other parts of the core for very little additional cost. As a result there is a substantial saving in the total cost with respect to a normal house having a fireplace.

Heat lost from the tank itself also goes into the house rather than being lost to the outdoors or to the ground as in the case of many prior structures. The insulating enclosure that surrounds the tank prevents any such heat loss from creating an undesirably hot region adjacent the core structure, but still it is advantageous not to lose such heat as does manage to escape through the enclosure. In the summer much of the tank will normally be cooled so that it will not radiate heat to the house.

A further advantage of the large water tank is that it may be used as a source of water to fight fires in the case of a house located at some distance from any other source of water. This not only provides an important safety factor in the construction of the house but may also be of some economic benefit in reducing fire insurance costs, especially in areas that lack adequate fire protection services.

The overall structure of the tank and the associated core components is basically enclosed within a space approximately eight feet by ten feet by twenty-four feet and, aside from the necessity of providing for a space of that size within the house plan, the structure of the present invention places minimal constraints on the architect. In areas where protection against wind is not necessary, there is no need to maximize the strength made available by placing the core structure near the center of the house. The house does require a roof with proper orientation for the solar panels. At the present time there are only a few hundred houses with sufficient solar panel area to provide a substantial part of the heat. Such houses may therefore appear strange at the present time. However, as oil and gas become more scarce and their prices increase, and as it becomes necessary to ration such fuels, as is already happening in the case of natural gas, more and more solar heated houses will be built and their panels will become so customary as to cease to be noticed. However, the core structure of the present invention does not depend upon any particular arrangement of solar panels but only upon obtaining a sufficient quantity of water heated to a sufficient temperature. In fact, water heated to two different temperatures is preferred since the upper part of the tank contains water that is normally at a higher temperature than the lower part of the tank.

BRIEF DESCRIPTION OF THE DRAWINGS

FIG. 9 is a cross-sectional view of the core along the plane IX—IX in FIG. 6.

FIG. 10 is a top view of the tank, heat pump, ducts and piping in FIG. 6.

FIG. 11 is a cross-sectional view of a fragment of the core in FIG. 6 along the plane XI—XI in FIG. 10.

FIG. 12 is a detail of one part of the cross-sectional view in FIG. 9.

FIG. 13 is a top view of a fragment of the structure for attaching the core in FIG. 6 to a house.

FIG. 14 is a cross-sectional view of the fragment along the plane XIV—XIV in FIG. 13.

FIG. 18 is a graph of heat transfer and temperatures in operation of the core in FIG. 6.

DETAILED DESCRIPTION OF THE INVENTION

FIGS. 1-5 are architectural drawings of a typical solar heated house 10 that incorporates the advantages of this invention. For the most part, the floor plans and furnishings are standard enough so that the only description will be with respect to the features that have particular relevance to this invention.

Figure 1:
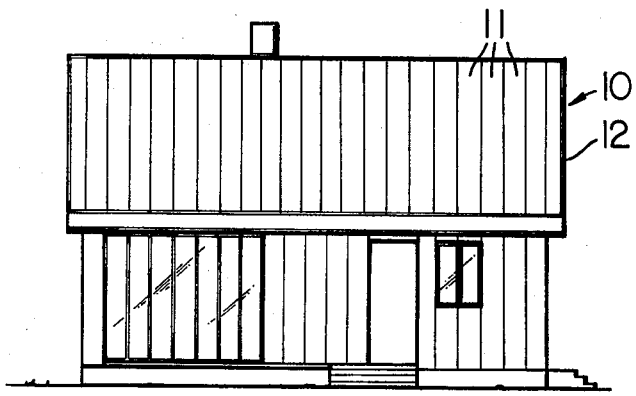
FIG. 1 shows a front elevational view of one example of a house incorporating the core structure of this invention.

FIG. 1 is a front elevational view of the house. This model is to be built so that it faces south, and it has a main roof section 12 covered with solar panels 11. These are, typically, shallow pans with a cover transparent to solar radiation. Within the shallow, enclosed space is a piping arrangement that normally covers most of the inner surface of the bottom of the pan and carries the liquid heat transfer medium.

There are existing solar heated, or more correctly, solar heat assisted, houses that use air as the heat transfer medium, but the great advantages of liquid will be brought out in the following description. The liquid need not be exotic; water is the most efficient heat transfer medium known.

Figure 2:
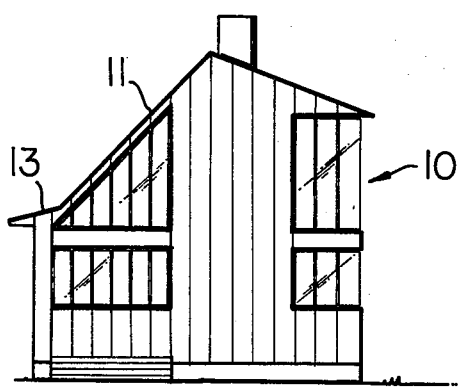
FIG. 2 shows a side elevational view of the house in FIG. 1.

FIG. 2 is an elevational view of the east side of the house 10. The solar panels 11 are most efficient in extracting solar heat in the winter if the pitch of the main roof section is such that the panels are perpendicular to the sun's rays. This means that the angle of pitch would correspond to the number of degrees of latitude of the site plus an additional number of degrees corresponding to the angular displacement of the sun on the far side of the equator during the few weeks immediately following the winter solstice. This is the time when the greatest amount of solar heat is needed. However, it is not necessary to be so exacting in selecting the pitch. In FIG. 2, the pitch of the section 12 is approximately 45°, which is common in many existing houses not heated by solar radiation.

One thing to be noted in FIG. 2 is the large amount of window area. It is desirable to use double glazing and to use wall construction and wall and roof insulation of good quality so as to minimize heat loss by radiation and by the escape of heat through cracks, but it is not necessary to create the feeling of living in a cave.

It should also be noted that there is an overhanging eave 13 that shades the south side of the house in summer, but allows direct entry of solar radiation into the living space during the winter. This is known as passive solar heating and is very helpful in minimizing the area of solar panels required for the main solar heating system and in reducing the air conditioning load in the summer.

Figure 3:
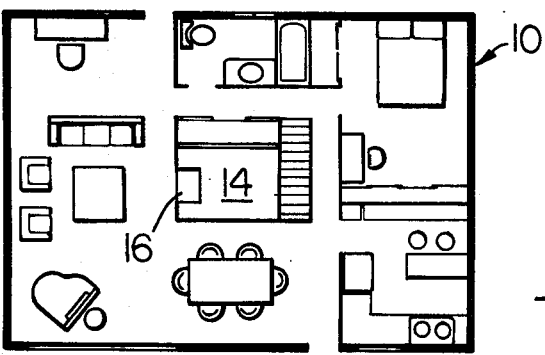
FIG. 3 is a plan of the first floor of the house in FIG. 1.

FIG. 3 shows the floorplan of the first room. It is only one of many possible arrangements. The features that are especially related to the advantages of this invention are a generally rectangular central area 14, referred to as a core, and a fireplace 16 set into one side of the core 14. An explanation of the core and its operation will form the major part of the following description but will not be considered in detail for the moment except to say that it occupies a floor space of about 8 feet × 10 feet, including the fireplace. The 8 foot dimension is chosen as the largest that can be accommodated on a truck trailer without having to be marked as a wide load.

The location of the fireplace on an interior wall is not an architectural novelty, but homeowners are so accustomed to seeing fireplaces on outer walls, and with most of the fireplace and chimney volume completely outside of the house that the advantages of the location in FIG. 3 should be mentioned. The ordinary, external fireplace not only does not add appreciably to heating the house, but may extract more heat than it replaces. Its heating efficiency is close to or below 0%. To operate, it must draw in a quantity of air, which typically enters via crevices all over the ordinary house, thereby cooling other rooms. Most of the heat it produces simply goes out the chimney. In order to draw well, it must have a column of air in the chimney heated to several hundred degrees, and attempts to extract much of this heat by a heat exchanger constructed immediately above the fireplace may so reduce the stack gas temperature that the fireplace will not draw well.

The fireplace 16 and its chimney will be described later, but they are arranged to be at least approximately 60-70% efficient in adding to the total stored heat. Thus, a few logs, even the imitation ones currently on the market, can furnish a substantial amount of heat in an extended period of abnormally cold weather (say 0° F.) outside with an unbroken cloud cover and high wind. It may be noted, that such a combination seldom occurs.

Figure 5:
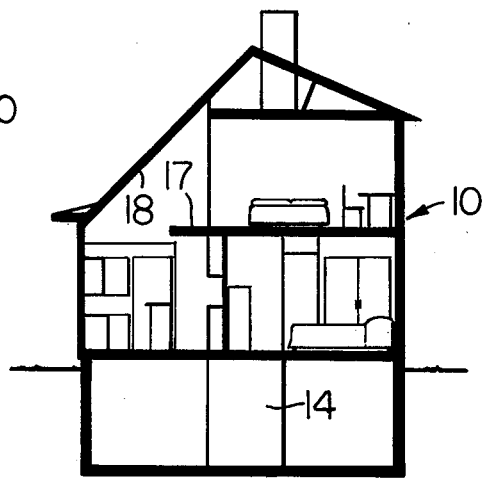
FIG. 5 is a cross-sectional view of the house in FIG. 2 with the outer wall visible in FIG. 2 removed.
Figure 4:
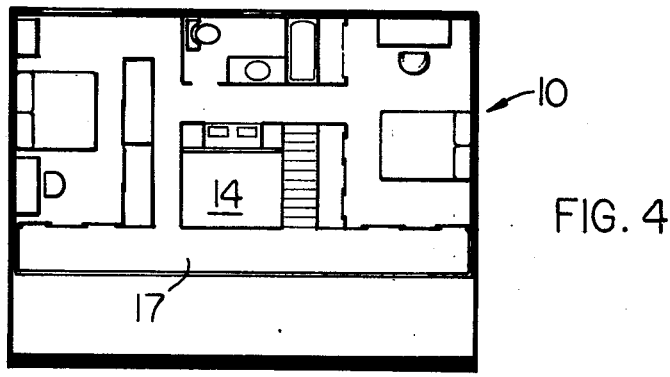
FIG. 4 is a plan of the second floor of the house in FIG. 1.

FIG. 4 shows that the core 14 extends up through the second floor and FIG. 5, which is a cross-section with the east wall of the house removed, shows that it extends down into the basement, if there is a basement. FIG. 5 also shows that the top of the core is approximately at the level of the second floor ceiling. If there is not a complete basement, a relatively small excavation not much larger than the core 14 is sufficient.

A very important advantage of the core structure is barely suggested in FIGS. 4 and 5: the core, arranged approximately in the center of the house, as shown, and connected structurally to the house, is so enormously strong and stable that the house 10 can virtually be suspended from the top of the core with only a minimal perimeter foundation. By structurally connecting the core and the rest of the house, as will be described shortly, the house can withstand winds of up to 120 miles per hour or even more. This strength also makes possible the balcony 17 and the long, virtually unbraced cathedral ceiling 18 that are the only suggestions in FIG. 5 of the enormous structural strength provided by the core 14.

Figure 6:
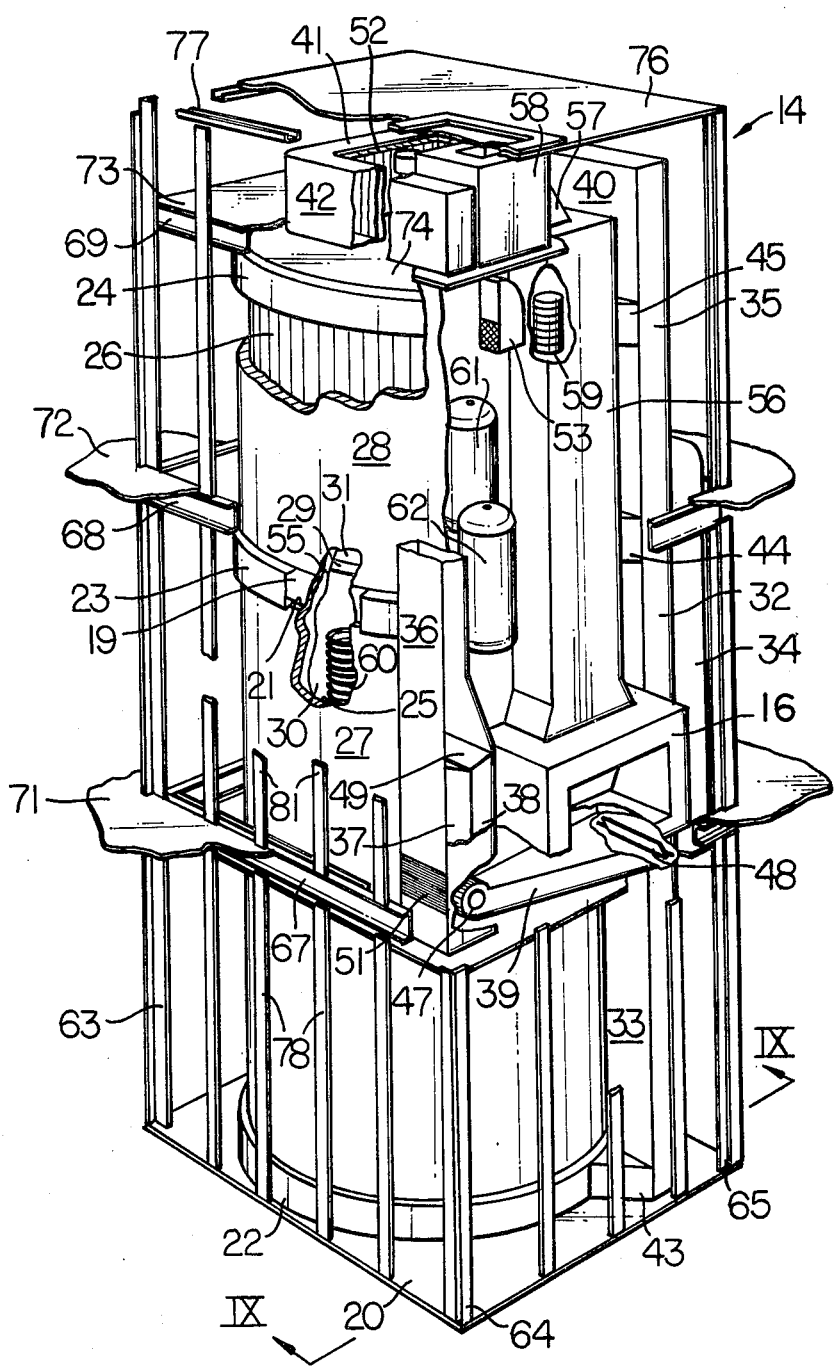
FIG. 6 is a perspective view of a core according to this invention.

FIG. 6 shows the core 14 most clearly, although, in order to maintain clarity, a number of the parts are not shown in that figure but are shown in the isometric and cross-sectional views that follow.

The heart of the core 14 is a tank 19, preferably about seven feet in diameter and about twenty feet long. The tank may be made of steel about 3/16 inch thick, and it holds approximately 6,000 gallons of water, which weighs about 48,000 pounds. The tank stands vertically on a base plate 20 that may be bolted on the basement floor. If there is no basement or if most of it is not floored, the base plate may be bolted to a concrete pad, preferably reinforced, and of sufficient thickness, say ten inches, to bear the weight of the core 14 and the house 10. The surface area of the pad should be at least about 10 feet × 12 feet, and if it is at least that size, it will spread out the load of the house, core, and water sufficiently to allow the house 10 in FIGS. 1-5 to be built even on loose sand, such as at a beach, or on soft clay.

The tank 19 is surrounded by a thin air space 21, and there are three circumferential ducts 22-24 encircling the tank 19 to feed air into or extract it from the space 21. Each of the ducts has a height of about 24 inches and a width of about six inches. The tank wall forms the inner wall of each of the ducts. The lower wall of the lower duct 22 and the upper wall of the upper duct 24 are sealed airtight to the wall of the tank 19; but the upper wall of the lower ducts, the lower wall of the upper duct, and both the upper and lower walls of the duct 23 are spaced from the tank wall to allow air to flow along the air space 21 against the tank wall under the control of suitable dampers.

It is one of the features of this invention that the controlled flow of air along the wall of the tank 19 enables the tank, itself, to act as a heat exchanger. Heat from the solar heated water in the tank is directly transferred through the tank wall of the air flowing along the wall, and this air is ducted to the house 10. No heat exchanger is 100% efficient; in each there is an imperfect transfer of heat across the barrier (in this cae, the tank wall) that separates one medium (in this case, the solar heated water in the tank) from a second medium (in this case, the air that heats the house).

One major advantage of this invention is that there need only be one heat exchange barrier between the water and the air. This is unlike other systems in which heat from the solar heated water is transferred through a first barrier to a hot water circulating system that pumps the secondarily heated water to radiators in which the heat must be transferred across a second barrier (the radiator structure) to the air in the house. Not only is such a system less efficient for a given cost than the present system because heat must be transferred across two barriers, but water in a radiator must be quite hot if it is to heat the adjacent air enough to create natural convection of the air over the radiator surface. In the system according to this invention, a fan forces the air along the large surface of the tank 19 to draw heat directly from that surface.

The heat transfer surface area of the tank 19 is increased by attaching fins to the outer wall of the tank. Such fins may be formed by wrapping two sections 25 and 26 of corrugated metal around the tank 19. The heat conductivity from the tank to the corrugated fins should be as high as possible which can be accomplished by gluing the corrugated metal to the tank wall by means of epoxy cement, for example.

The air that flows along the tank wall is kept in the space 21 in immediate proximity to the wall and the fins by a layer of insulation that rests on the ridges formed by the corrugations in the metal sections 25 and 26. Like the two sections of the corrugated metal, the insulation is separated into two sections: a section 27 between the ducts 22 and 23, and a section 28 between the ducts 23 and 24. The insulation material can be glass fiber between two layers of paper or other suitable material substantially impervious to air. The detailed reasons for separating the fins into two sections 25 and 26 and the insulation into two corresponding sections 27 and 28 will be described later, but it is generally related to the fact that the tank 19 is separated by an inner heat-insulating barrier 29 that divides the tank 19 into a lower section 30 and an upper section 31. The lower section holds about 4,000 gallons and the upper section holds about 2,000 gallons, primarily for heating the household hot water.

The core 14 includes several vertical duct sections 32-38 and horizontal duct sections 39-42. The vertical ducts 33, 32, and 35 are connected to the circumferential ducts 22-24 by enlarged sections 43-45, respectively. A fan 47, which is a standard ventilating fan for a forced air heating and cooling system, circulates air through the ducts and is pivotally mounted at the intersection of the ducts 38 and 39 so that it can either direct air up through the duct 38 or through the duct 39. The direction of airflow through the ducts depends on the mode of operation, whether the building is to be heated or cooled. Actual control of airflow is determined by the direction in which the fan 47 faces and by the settings of dampers in the ducts. Only two of these dampers 48 and 49 are shown in FIG. 6, but other dampers will be shown and their settings will be described in detail in connection with later figures.

The system may have several air intake locations; the only one shown in FIG. 6 is the intake 51, which is just above the level of the first floor. Several outlets are also provided, although none are shown in this figure. Two additional components that are directly involved with airflow in certain modes of operation are a heat exchanger 52 for a heat pump and an enclosure for a dehumidifier 53. The dehumidifier 53 is located near the upper end of the duct 36, although that part of the duct is not shown, having been broken away to allow other components to be shown.

The core incorporates the fireplace 16 and a section 56 of a chimney molded of suitable material, such as a refractory concrete that is capable of withstanding the mechanical stresses of being shipped from the factory to the building site. The floor of the fireplace 16 is just above the level of the first floor and, in the form illustrated, has an opening about 36 inches wide and about 30 inches high. At the top of the chimney section 56 is a sheet metal mmeber 57 that connects to a short chimney extension 58. The latter extends through the roof of the building in the same way as a normal chimney.

Near the top of the chimney section is a coil 59 of hollow tubing of stainless steel or some other metal capable of withstanding the temperature, which may be of the order of 600° F. when the fireplace is in use. Both ends of the coil 59 are connected to the tank 19, and at least the lower end of the coil is below the normal water level in the tank so that the coil 59 will be at least partly filled with water.

The high temperature stack gas in the region of the coil vaporizes water in the coil when the fireplace is in use. The vapor is transported to the tank by simple vapor pressure. There the heat in the vapor is transferred directly to water in the tank and the space in the coil 59 is replaced by tank water that is less hot. This heat transfer from the stack gas to water in the tank does not require any mechanical pump but is simply a reflux action. Furthermore, the removal of heat from the stack gas near the top of the chimney section 56 still leaves a long column of hot gas of low density from the fireplace 16 to the heat exchange coil 59, so that the fireplace draws well and does not pour smoke into the interior of the building. And, of course, not all of the heat in the stack gas is removed by the heat exchange coil 59, although approximately 60-70% of the heat combustion of the fireplace will be recovered either as direct radiation from the fireplace or as an addition to the quantity of heat stored in the tank 19.

The coil 59 is not likely to need service or replacement, but if it ever does, it can easily be reached by removing the sheet metal member 57.

One final aspect of the fireplace is that it is the only place in the building, except for the kitchen stove in FIG. 3, where the temperature reaches the combustion temperature of normal building materials. The firewood or other material normally burned in the fireplace is not available to feed the flames, contrary to the oil or gas supply of a furnace required in a conventional house but not in the building heat with heat stored in the tank 19. Thus, fire in the fireplace 16 cannot go out of control due to some fault causing excessive fuel to be fed to it automatically. And if, with great age, some fault occurs in the refractory concrete structure, that structure is immediately adjacent a large tank of water, which can absorb heat far better than any structure in a conventional house.

Another coil 60 of tubing is submerged in the lower section 30 of the tank 19 and connected to tubing in the heat exchanger 52. The coil 60, itself, is also a heat exchanger by which heat in the water in the section 30 is transferred to or from the fluid in the coil 60 and the latter fluid is pumped through finned coils in the heat exchanger 52 to be transferred to or from air passing between the fins. The actual modes of operation of these parts will be described later.

It should be noted that the entire interior of the tank 19 is permanently protected against corrosion. This could be done by making the tank of noncorrosive material or by coating its inner surface with a protective layer or by filling the tank with a flexible but sturdy bag 55 of a material like polyethylene that virtually coincides with the shape of the interior of the tank. Since such a bag would simply be subjected to the pressure of water forcing the bag against the inner wall of the tank, any wrinkles in the bag would be pressed flat. The bag would not be subjected to any motion, and therefore, not to any wear, so it should last indefinitely.

Two relatively small tanks 61 and 62 are shown in FIG. 6. The tank 61 is the tank for household hot water to be used in food preparation, and bathrooms and laundry in the manner of normal hot water in conventional houses. However, unlike conventional hot water tanks that are usually heavily and expensively insulated and are heated by expensive electricity or gas or, at best by a heat exchange coil in the furnace, the tank 61 is an uninsulated tank directly immersed in the upper section 31 of the tank 19 above the divider 29. The water in the inner tank 61 is heated by the wter in the 2,000 gallons of water in the upper section 31 of the main tank 19. The water in this section is normally kept at an average temperature of about 120° F., which means that instead of having a relatively small 50 or 100 gallon hot water tank 61, the available hot water is equivalent to several hundred gallons.

The tank 62 is outside of the main tank 19 and is not required if a supply of water under pressure is available. The tank 62 is a pressure tank that has water pumped into it from a non-pressurized source, such as a well. In this type of tank, which is well known, air in the upper part of the tank 62 is compressed. It is this compressed air, rather than direct pump pressure, that forces water out of the tank to all of the water faucets in the building.

The only remaining parts of the core 14 in FIG. 6 are the support and framing members. There are four vertical members of which only three members 63–65 are shown. These are welded or otherwise firmly attached to the base 21 and to three sets of beams 67–69 in the form of shallow, U-shaped channel members. The sets of the beams 67 and 68 are floor support beams to support the first and second floor beams of the building. Small sections of the first and second floors 71 and 72 are shown.

At the top of the tank 19 is a platform 73 on which the duct sections 40–42, the chimney section 58, the sheet metal member 57, and the heat exchanger 52 and related components rest. Under the platform 73 is a cover 74 for the tank, and both of these members are arranged to provide access to the tank, but only for qualified persons on the rare occasions when service must be performed on components inside the tank.

At the top of the core 14 is a top 76 held by a fourth set of beams 77 less sturdy than the sets 67 and 68. Between the base 20 and the set of beams 67 is a set of vertical wooden studs 78 to nail panels of wood or wallboard or lathing to in the same manner as such panels are attached to any other studs in the building. Other such sets of studs 81 extend from the set of beams 67 to the set 68 and from the set of beams 68 to the set 77.

Figure 7:
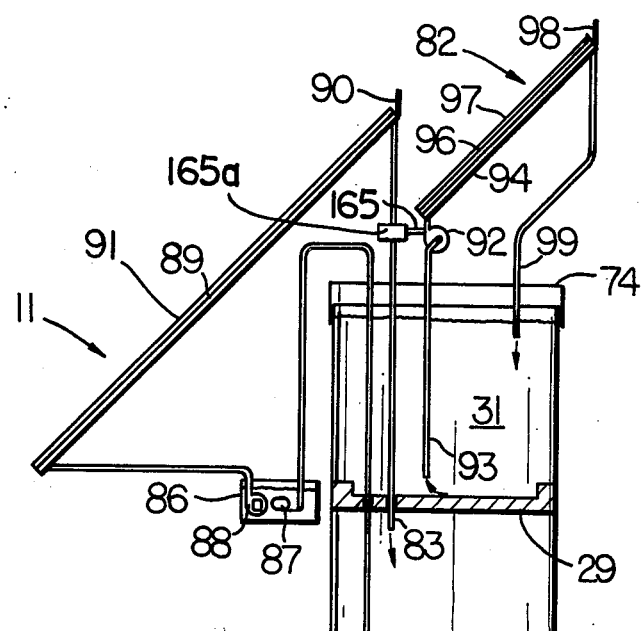
FIG. 7 is a schematic representation of the connections between the core of FIG. 6 and solar panels.

FIG. 7 illustrates the way the water circulates through the tank 19 and two sets of panels 11 and 82 in which solar heat is collected. None of the ducts or components associated with circulation of the air and none of the details of the building are illustrated in this figure. The panels 82 may consist of panels that, at least externally, resemble the panels 11, and they may be located alongside the panels 11.

Two pipes 83 and 84 extend down through the top 76 into the lower section 30. Both of these pipes pass through the upper section 31 and through the heat-insulating barrier 29. The pipe 83 terminates near the top of the lower section 30 while the pipe 84 extends almost to the bottom of the lower section.

In the simplified arrangement in FIG. 7 the pipe 84 is bent over outside the tank 19 and extends into an open-topped or vented tank 86 below the lowest level of the panels 11. A float valve 87 in the tank 86 allows water to flow from the tank 19 into the tank 86 but not in the reverse direction. A pump 88 pumps water from the tank 86, and ultimately from the tank section 30 into the lower part of each of the panels 11. The pump 88 imparts enough force to the water to cause it to flow up the water passages 89 in the panels to an accumulating pipe (not shown) that leads to the pipe 83. At the top of the panels is a vent 90 that allows the water in the panels 11 to flow back into the tank 86 at night or whenever it is not desirable to circulate the water through the panels. The panels have a layer 91 of transparent plastic or glass glazed to the panels to insulate the water passages 89 from cold air.

Water is circulated in the upper tank section 31 and the panels 82 by a pump 92. This pump is connected in a pipe 93 that extends through the top 76 of the tank 19 and down near the heat-insulating barrier 29 that divides the lower and upper tank sections 30 and 31. This barrier incidentally, need not be water-tight. In fact it should have a small opening to allow water to flow from the upper section 31 to the lower section if too much water is drawn out of the lower section. The pipe 33 is joined by a manifold (not shown) to the lower ends of all the water passages 94 in the panels 82. It is expected that these panels will operate in a higher temperature range than the panels 11, and therefore, the panels may be provided with two layers 96 and 97 of glass instead of a single layer 91, as in the panels 11.

The upper ends of the water passages 94 are connected together to a vent 98 and to a pipe 99 that leads back into the top part of the upper section 31 of the tank 19. The vent 98 permits water in the passages 94 and the pipe 99 to flow back into the tank 19 when the pump 92 is turned off at night or at another time when it is impossible or undesirable to obtain additional heat from solar radiation. Both of the pumps 88 and 92 should permit water to flow out of the panels 11 and 82 if the electric power fails.

Solar radiation striking the panels 11 and 82 heats up the water flowing in the passageways 89 and 94. The amount of heat picked up by the water is a function of several factors. One is the temperature of the water pumped into the lower ends of the panels 11 and 82. During the daytime when the flow is relatively constant, water is obtained from the lower part of the lower section 30 of the tank 19 and delivered by way of the pipe 84 through the tank 86 to the lower end of the panels 11 at approximately the temperature that exists at the lower part of the lower section 30. Preferably this should be of the order of about 90° F. The temperature at the lower part of the upper section 31 picked up by the pipe 93 may be of the order of 120° F.

Another factor that determines the amount of heat picked up by the water flowing through the panels 11 and 82 is the rate at which water is pumped through these panels. The slower the flow of water, the longer each incremental volume of water will be exposed to radiation and thus the hotter it will be. Typically, the temperature of the water at the top of the panels 11 is of the order of about 110° F. while the temperature of the water at the top of the panels 82 is about 140° F. Thus the temperature gradient in the lower section 30 of the tank 19 will be from about 110° F. down to about 90° F. and in the upper section 31 will be from about 140° F. to about 130° F. The average temperature at the center of these sections of the tank 19 is therefore about 100° F. for the lower section 30 and about 135° F. for the upper section 31. These are approximately the same values as the average temperature in the panels 11 and 82, respectively, except for radiation loses in the piping.

Figure 8:
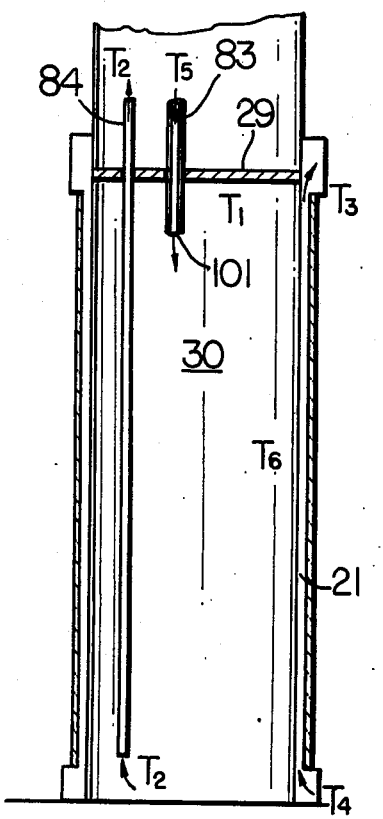
FIG. 8 is an illustration of heat flow in the core in FIG. 6.

FIG. 8 illustrates temperature relationships during heat flow from the water in the tank 19 to air in the space 21. The water just below the insulating barrier 29 has a temperature $T_1$. At the bottom of the tank the water has a temperature $T_2$. The air emerging from the air space 21 into the duct 23 has a temperature $T_3$, and the air entering the space 21 from the duct 22 has a temperature $T_4$. The water emerging from the pipe 84 has a temperature $T_5$. At the vertical midpoint of the tank section the water has a temperature $T_6$ and in the air space just outside the midpoint of the tank section 30 the air has a temperature $T_7$. It will be considered that under normal operating conditions, the following equations are true:

$$T_6 = T_1 + T_2/2 \qquad (1)$$

$$T_7 = T_3 + T_4/2 \qquad (2)$$

The quantity Q of heat transferred from the water in the tank section 30 to the air in the space 21 is the product of the mass flow rate M times the specific heat $C_p$ of air times the difference between the temperature $T_3$ of heated air emerging from the top of the space 21 and the temperature $T_4$ of cooler air entering the bottom of the space 21. This may be expressed as:

$$Q = MC_p(T_3 - T_4) \qquad (3)$$

The value of M is determined by the capacity of the fan that moves the air and the size of the ducts through which the air moves. Therefore M is constant for a given system. The specific heat $C_p$ is also constant. For a useful quantity Q of heat, the temperature $T_3$ has a minimum useful value, and under such conditions, since the other factors in equation (3) are constants, the temperature $T_4$ must be at a constant minimum value.

If the difference between the water temperature at any horizontal level in the tank section and the air temperature at the same level is approximately constant, $$T_2 - T_4 \approx T_1 - T_3. \qquad (4)$$

In that case, Q may also be defined as $$Q = hA(T_6 - T_7), \qquad (5)$$

where h is the heat transfer coefficient of the surface of the tank section 30 and A is the effective heat transfer area of section 30. Thus, if the minimum values of $T_4$ and $T_3$ are established, the minimum useful value of $T_6$ is established. Since $T_3$ and $T_4$ in equation (4) are known, the temperatures $T_2$ and $T_1$ are also known, thus establishing their respective minimum values.

The temperature difference $T_1 - T_2$ in the tank section 30 is a function of the mass flow rate of water through the solar panels 11 (FIG. 7) and of the heat input to the panels. The efficiency of heat collection is inversely proportional to the average temperature $T_5 - T_2/2$ in the panel 11, and for a given value of $T_2$, the value of $T_5$ should be minimized. However, $T_5$ is the temperature of the water from the panels 11 and, omitting any losses in the pipe 83, is the temperature of the water emerging from the pipe 83 into the tank section 30. The temperature $T_5$ should not be less than the temperature $T_1$ or else the water in the tank section 30 will be reduced. The optimum value of $T_5$ is therefore equal to $T_1$. Maximum heat input to the tank section 30 is achieved when $$T_5 - T_2 = T_3 - T_4, \qquad (6)$$

and the mass flow rates M and h of air and water, respectively, should be chosen to produce this desired result under anticipated solar conditions when the water in the tank section 30 is at its lowest useful temperature.

As an alternative to slowing down the rate of water flow to allow each incremental quantity of water to remain in the panels 11 longer and thus be heated enough to raise it to the temperature $T_1$ on those days when the solar radiation is weak, another pipe 101 telescoped inside the pipe 83 can be extended down into the tank section to allow the water to emerge from the extended pipe 101 at a level where the temperature is not less than the temperature $T_5$. As a further alternative, the water can be pumped intermittently, which is equivalent to pumping it continuously at a slower than normal rate.

One of the important advantages of the present invention is that the vertical tank 19 makes it possible to have a temperature gradient of the water inside the tank in such a way as to permit heat to be drawn from water that is actually well below the desired temperature of the air entering the house from the heat exchanger and in some cases below the desired average temperature of air in the house. For example, if it is assumed that the average temperature of the air in the house is 70°, the lowest temperature $T_4$ of the incoming air is 65° F and that the lowest outgoing air temperature $T_3$ must be 85° F. to maintain a satisfactory temperature in the living quarters of the house, and if it is further assumed that the difference between the average water temperature $T_6$ and the average air temperature $T_7$ in the space 21 is 8° F., then the foregoing equations, which were established for such minimum temperature conditions, permit the temperature $T_2$ at the bottom of the tank to be only 73° F. and the temperature $T_1$ at the top of the section 30 of the tank to be 93° F. The 73° F. temperature $T_2$ at the bottom of the tank is below the outgoing air temperature of the core which is 85° F. If the difference $T_7 - T_6$ is less than 5° F., for example 3° F.; then the temperature $T_2$ would be 68° F. which is below the average temperature of the air in the house.

The advantage of the vertical tank can also be understood by supposing that a tank having the same dimensions as the tank 19 was laid on its side instead of being upright and was supported in such a way that the air space 21 could be maintained even in the horizontal position. The difference in spacing between the top and the bottom of such a horizontally placed tank would then only be the diameter of the tank. This would preclude a large temperature differential from existing, and in addition, the air that flowed along the space 21, assuming that such air flowed in lines parallel to the axis of the tank, which would be true because of the fin structure, would pick up heat from water that did not have any temperature differential. As a result, the average water temperature in the tank would have to be higher than the average water temperature in a vertical tank, and there would be no possibility of having the air pick up useful heat from water having as low a temperature as the lowest permissible temperature $T_2$ in a vertical tank. Even with a tank the same size as the tank 19, but arranged horizontally instead of vertically, it would not be possible to reduce the water temperature as low as is permissible with a vertical tank. Therefore, a horizontally arranged tank would not be able to supply sufficient heat over as long a period of inclement weather as can the vertical tank according to this invention.

It is also important to the success of the present invention that the air in the space 21 flows in the direction such that the air picks up temperature as it moves past tank surface levels of increasing temperature. It is always important to keep the temperature differential across the heat barrier, in this case the wall of the tank, as low as possible for the maximum efficiency of heat transfer. This is also true in the operation of the solar panels 11 and 82 in FIG. 7. The lower the temperature of water circulated through the solar panels, the higher the collection efficiency. This is in part due to the fact that the lower the temperature of the water in the panels, the lower will be re-radiation of the heat out of the panels.

FIG. 9 shows most of the main ducts in the core 14 and three additional dampers not shown in FIG. 6. These include a damper 102 in the duct 33, a damper 103 in the duct 32, and a damper 104 in the duct 35. Two short horizontal ducts 106 and 107 connect with lower and upper ends of the duct 34 and serve as couplings to hot air distribution ducts (not shown) in the structure of the building. Near the upper end of the duct 36 is a second air intake 108. Just inside the lower air intake 51 and within the duct 37 is an air filter 109.

Several other components of the dehumidifier 53 are shown in FIG. 9. These include the compressor 110, a fan 111, a condenser 112, and an evaporator 113.

FIG. 10 shows the mechanism in the upper part of the core 14. In addition to the ducts previously described in connection with FIG. 6, FIG. 10 shows two small ducts 114 and 115 that lead from the horizontal duct 41 down into the upper part of the tank. Two small dampers 116 and 117 are inside the ducts 114 and 115, respectively, and two more dampers 118 and 119 are shown in the duct 41. The heat exchanger 52 forms part of one wall of the duct 41. Another heat exchanger section 120 forms part of the wall of the duct 42 and the intersection of this duct with the duct 36. The heat exchangers 52 and 120 make up the condenser of a heat pump, which also includes a compressor 121 and a motor 122 to operate a fan that is not shown in FIG. 10. A part of one wall of the heat pump includes another damper 123.

Two mounting pads 124 and 126 are mounted directly over the edge of the tank 19. These pads can receive uprights to support the roof structure of the house. Since the pads are over the tank wall, the tank, itself, forms an extremely strong column capable of supporting not only the roof but also the walls of the house. In fact, the house can be virtually suspended from the vertical supports on the pads 124 and 126.

FIG. 11 shows a fragment of the structure in FIGS. 9 and 10 to illustrate primarily the placement of the heat pump. The heat pump condenser made up of the sections 52 and 120 is shown, along with the condenser 121 and the fan 122. Directly above the fan is a controllable louver 127. A damper 125 is located alongside the louver 127 and at the top of the intersection of the ducts 40 and 36, and another damper 130 is located at the bottom of the intersection of the ducts 36 and 40.

FIG. 12 is a detail of the section of FIG. 9 around the blower 47. This blower is pivoted on an axis 128 so located that it permits the blower to be pivoted counterclockwise to the position shown in FIG. 12. In this position it directs air up the duct 38. Alternatively, the blower 47 can be pivoted clockwise about the axis 128 to direct air along the duct 39, as shown in FIG. 9. When the blower 47 is in the position shown in FIG. 9, the damper 49 is in its clockwise position to close off the duct 38, but when the blower 47 is in the position shown in FIG. 12, the damper 49 is in the position to open the duct 38.

FIG. 13 and FIG. 14 show the structure by which the house is mechanically connected to the core 14 to absorb horizontal wind loads. The structure is FIG. 13 includes a perimeter structural channel 129 that goes horizontally around the core 14 at a level just above the floor 71. This channel is welded to the vertical corner members of which only the member 63 is shown in FIG. 13. A circular steel angle 131 encircles the tank 19 and is connected to the tank by a zig-zag rod 132 that is welded to the wall of the tank and to the circular member 131. The circular member is connected to the structural channel 129 by a bracket 133 welded to the channel and to the circular member 131.

FIG. 14 shows a cross-sectional view of the connecting members in FIG. 13. FIG. 14 shows that there are actually two structural channels 129 and 134. The beam 67 is shown bolted to vertical corner member 63 and bracket 133 and supports the floor 71, which is the first floor of the building. The bracket 133 extends over the channel 134 and is stepped down and welded to the lower edge of the circular angle member 131.

As may be seen, the corrugations 25 that form the lower fins have a gap to accommodate the zig-zag rod 132. The insulating material 27 also has to be formed in two sections, but these must be joined together to make the insulation air tight around the bracket 133.

There are actually four brackets like bracket 133 on four sides of the tank 19. The flexiblity of these brackets and of the zig-zag member 132 is sufficient to allow the tank 19 to expand vertically as the water inside gets hotter and hotter. The amount of expansion may be approximately ¼ inch at the level of the second floor 72, but because of the flexibility of the bracket 133 and the zig-zag member 132, this vertical change is not transmitted to the floor 72, itself, and the floor therefore remains level. The structure shown in FIGS. 13 and 14 is sufficient to permit the floor beams (not shown) extending from the core to be cantilevered, which is another way in which the core 14 can be used to support the building structure without any perimeter foundation, if desired. It is likely, of course, that there would be such perimeter foundation, but in the case of lots that do not lend themselves to such a structure, it may be omitted by virtue of this invention.

Figure 15:
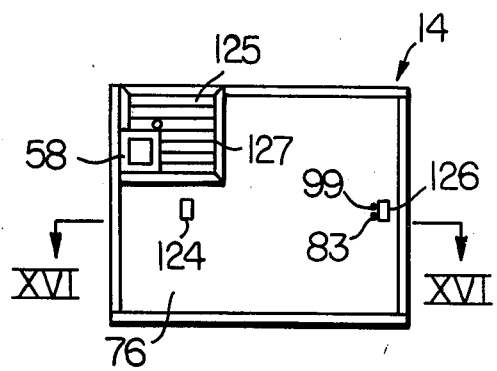
FIG. 15 is a top view of the core in FIG. 6.

FIG. 15 is a view looking down on the core 14. Most of the components are covered by the top 76 but the pads 124 and 126 are visible through openings in the top. The louver 127 and the damper 125 are shown adjacent the chimney extension 58. Two pipes, 83 and 99, which come from the solar panels 11 and 82, respectively, pass through the top 76 near the pad 126.

Figure 16:
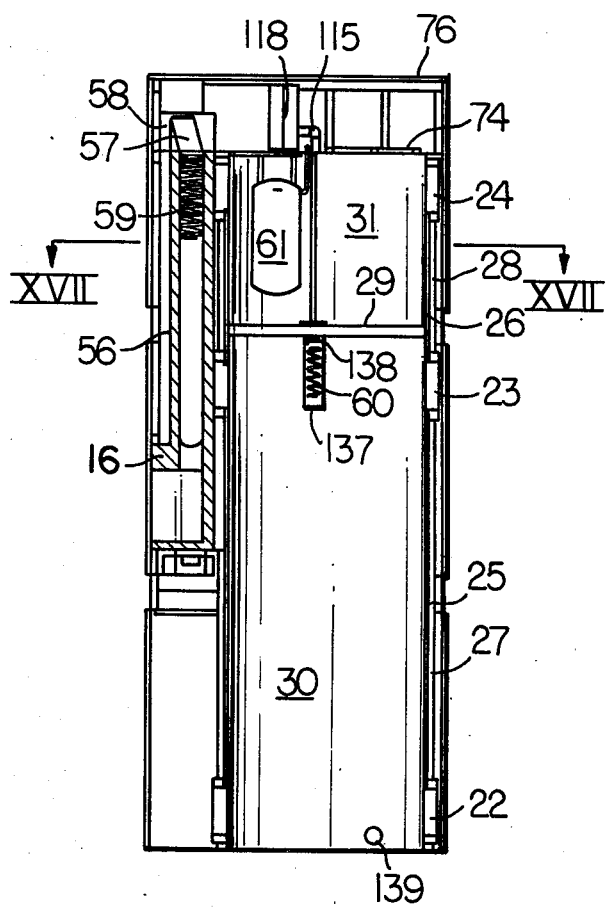
FIG. 16 is a cross-sectional view of the core in FIG. 6 along the plane XVI—XVI in FIG. 15.

FIG. 16 is a cross-sectional view showing some of the components inside the tank 19. The only component not previously described is an evaporator 137, which is supported just below the barrier 129 and is connected by pipes to the heat pump compressor 121 in FIGS. 10 and 11. The evaporator consists of the simple coil 60 of tubing shown in FIG. 6 and similar to the heat exchanger 59 and is surrounded by a cylindrical enclosure that is open at the bottom and has an opening 138 at the top, that permits water in the lower section 30 to circulate through the coil of the evaporator 137.

In the lowermost part of the lower section 30 is an outlet 139 through which the tank may be drained if desired. This outlet can be connected to a hose to permit the thousands of gallons of water in the tank 19 to be used to fight fires in the building. In order to provide sufficient water pressure for this purpose, an electric pump may be used, but the pump must be arranged so that it can be bypassed in case the fire has interrupted the electric power. In that case there will still be enough pressure to fight basement and first floor fires. The water can be drawn out into buskets, if necessary.

Figure 17:
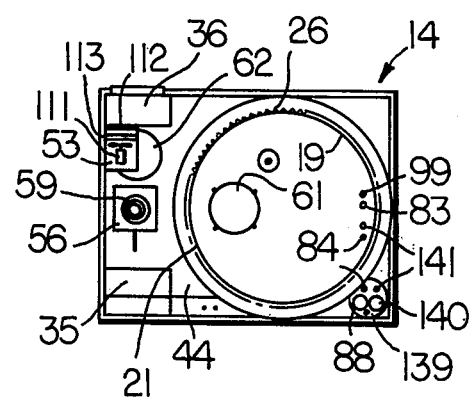
FIG. 17 is a cross-sectional view of the core in FIG. 6 along the plane XVII—XVII in FIG. 16.

FIG. 17 is a cross-sectional view of the upper part of the core 14. As may be seen, the hot water tank 61, which is also shown in FIG. 16, is supported inside the tank 19.

FIG. 17 also shows pumping means to pump liquid from the tank to the panels and from the panels back into the tank. This embodiment is different from that shown in FIG. 7 in the sense that the liquid from the panels is not held within a separate tank. In addition, the panels 11 and 82, which are shown in FIG. 7, are to be considered as being connected in series by the connection 165 with a manually operable valve 165a at the juncture of the pipe 83 and the connection 165. The valve 165a may so control the flow of water in the pipe 83 from the panels 11 that all of this water may flow through the pipe 83 into the lower section 30, that all of this water may flow through the connection 165 into the upper section 31, or that the water first flows through the panels 11 and is then divided into two streams, one of which flows back to the lower section 30 of the tank 19 through the pipe 83. The other stream flows into the lower manifold of the panels 82 to be heated still more. The water from the panels 82 is returned to the upper section 31 of the tank, just as in FIG. 7. The pumping means in FIG. 17 utilizes the pump 88, alone, to pump all water from the pipe 84, which has its intake at the bottom of section 30 of the tank. The pipe 84 is indicated in two locations only because the cross-sectioning plate cuts it twice. The pump 88 is located on a small sump 139, and if too much water enters this sump, it will automatically go down the drain and outside the house. Another pump 140 located on the sump 139 is connected to the tank 19 by a pipe 141 to pump water back into the tank from the panels at night or whenever no solar radiation is to be received.

The operation of the system will be described by first analyzing the modes of controlling the flow of air within the house for heating, ventillating, and cooling.

Mode A — Normal Heating

The fan 47 and most of the dampers and louvers are shown in FIGS. 9-11. The position of the fan 47 is considered to be its normal position since this is the position for most of the modes. In this position, the fan draws in air through the louver 51 and, to some extent, through the louver 108. This air passes through the filter 109 and then reaches the fan, which impells the air through the duct 39. The air is deflected down the duct 33 by the damper 48, which is in its normal heating position, and past the open damper 102 to the lowest circumferential duct 22. The air flows upwardly from all areas around the tank 19 into the air space 21 into which the top of the duct 22 opens.

As the air, which is at its coolest temperature as it enters the circumferential duct 22, flows upwardly through the air space, its temperature is raised by heat that passes directly through the tank wall. Part of this heat passes directly to the air in the air space 21 from the tank wall, but a substantial additional part is conducted through the tank wall to the fins formed by the corrugated material 25. When this air reaches the circumferential duct 23, it emerges through that duct and through the enlarged section 44 to the duct 32. The damper 103 is open, and so the heated air is able to pass down the duct 32 and be deflected by the damper 48 to the duct 34. Part of this heated air emerges through the short duct 106 to other ducts (not shown) in the first floor of the house, and another part flows up the duct 34 and emerges through the short duct 107 connected to other ducts (not shown) at the level of the second floor. The air is prevented from flowing up the duct 35 by the closed damper 104.

This is the normal mode of operation when the temperature at the top of the lower section 30 of the tank 19 is at least approximately 90° F. The temperature at the bottom of the lower section 30 could be as low as about 70° F., depending upon the severity of the weather.

Mode B — Supplemental Heating

If the temperature range in the lower section 30 of the tank drops below the range of approximately 70° F. to 90° F., the operation of the core may be switched so that additional heat can be drawn from the hotter upper section 31. In order to do this, the damper 103 is closed so that air cannot emerge from the circumferential duct 23 but most flow up a continuation of the air space 21 to the duct 24. At that level, the air emerges through the enlarged section 45 to the duct 35. The damper 104 must now be open to allow part of the heated air to flow out through the short duct 107 and another part to flow down the duct 34 and out the short duct 106.

Thus, in Mode B the air picks up heat not only from the lower section 30 of the tank but also from the hotter upper section 31. This, of course, reduces the temperature used to heat the hot water tank 61, but the higher temperature water in the upper section 31 has enough heat stored in it to supply heat to the tank 61 and still have a substantial amount left over to heat the air.

Mode C — Short Term Heat

In the case of a prolonged severe stretch of cold weather in the winter or in the case of an uncomfortably cool day late in the spring or in the summer or early in the fall when the water in the lower section 30 is deliberately kept cool, it is necessary to draw all heat directly from the upper section 31 of the tank 19. The fan 47 and the damper 49 are kept in the same positions as for Modes A and B but the damper 48 is turned 90° so that air flowing along the duct 39 is deflected upwardly along the duct 32 and past the open damper 103. This air then flows into the circumferential duct 23 and along the upper part of the air space 21 surrounding the upper section 31 of the tank. This heated air emerges at the uppermost circumferential duct 24 and flows down the duct 35 past the open damper 104 to emerge at the short duct 107. Part of this heated air also flows down the duct 34 to emerge at the short duct 106. The damper 102 is closed to act as a further deterrent to any air that might get past the damper 48 and flow down the duct 33 into the lower circumferential duct 22.

This mode derives all heat from the upper section 31 which supplies heat to the domestic hot water system by way of the tank 61. As a result, it would not be desirable to continue to derive all heat from this section for too long. One way to avoid drawing the heat content down too low a level is to burn a few logs in the fireplace 16. A substantial part of the heat from these logs will be transferred to the heat exchanger 59 and from there to the upper section 31 of the tank. Imitation logs now on the market can supply about 90,000 BTUs. If the fireplace 16 is 60 to 70% efficient, then about 54,000 to 63,000 BTUs will be obtained from the logs, partly in the form direct to the living space and part in the form of heat transferred through the heat exchanger 59 to the tank 19. Regular logs can also be burned in the fireplace, as can coal, to provide heat. Furthermore, the core 14 can include an incinerator with a heat exchanger similar to the heat exchanger 59 to extract heat from burning rubbish. For the purpose of illustrating this invention, the fireplace 16 may be considered as an incinerator.

Mode D — Heat Pump

If fire wood is unavailable or there is some reason not to use it, the heat pump may be brought into use. In this mode, the fan 47 is pivoted on its axis 128 to the position shown in FIG. 12, and the damper 49 moves to the left to open the duct 38 to the duct 36. Air still enters through the louver 51 in the same way as before and then is blown up the ducts 38 and 36 by the fan 47. The damper 130 at the top of the duct 36 is open so that the air passes into the duct 42 as shown in FIG. 10. It goes through one part 120 of the heat exchanger condenser for the heat pump and into the heat pump chamber that contains the fan 122 and the heat pump compressor 121. The damper 119 is closed, so that the air goes out of the heat pump chamber through the heat exchanger section 52 and past the open damper 118 in the duct 41. It goes through the duct 40, down the duct 35, and part of its goes out the short duct 107 while the remainder continues down the duct 34 and out the short duct 106.

It may not be necessary in certain climates to provide all of the heat modes just described. For example, the heat pump may be omitted if it is unnecessary to have either air conditioning or the Mode D heating. It is also possible to provide an immersion electric heater in the upper section 31 of the tank 19.

If any of the heating modes it may be desired to humidify the air being circulated through the house. The humidification means includes the little ducts 114 and 115 that connect with the large duct 41 and extend down to the upper section 31 of the tank 19. The ducts do not actually extend into the water itself but terminate just under the top 74 of the tank. The water does not fill the tank completely; there is a space of several inches between the top of the water and the top of the tank. In order to humidify the air, it enters this air space just above the water through one of the ducts 114 or 115 and leaves through the other duct after moving across the limited space between the water and the top 74 of the tank. This water is quite hot and has a high vapor pressure so that it humidifies the air passing across it.

In Modes A and B there is a very slight reduction in air pressure in the duct 36 due to suction caused by the fan 47. And there is a slightly higher pressure in the duct 35, which creates a differential capable of forcing air down the small duct 114 when the damper 117 in that duct is open. After flowing across the surface of the water in the tank, this air comes out by way of the duct 115 and past its open damper 116 and reenters the main duct system via the duct 42. The damper 130 may be open to allow the air with high vapor content to enter the vertical duct 36 so as to pass down that duct and be circulated by the fan 47.

During the humidification of the air, a substantial amount of the total circulated air is still going to be drawn in through the louver 51. That is, the fan will be circulating about 1,600 cfm of which about 1,500 will enter by way of the louver 51 and the other 100 cfm will be the humidified air that passes through the ducts 114 and 115.

To consider the path that the air takes during humidification in Mode A and in more detail, it must be realized that the air that is rising up through the air space 21 from the lowermost circumferential duct 22 and supposedly emerging at the middle circumferential duct 23 does not all follow that path. Part of the air goes through the upper part of the annular section 21 as in the case of Modes B or C and reaches the circumferential duct 24. Normally in Mode A, the damper 118 would be closed so that there would not be a large amount of circulation. The only air that could take this leakage path would be the air that could get through the ducts 114 and 115, and with the small differential of pressure available, this limits the air flow to about 100 cfm through those small ducts.

The humidification system is extremely effective because there is a very large area of water at a high temperature, and the air just above that water is virtually saturated with vapor, even if 100 cfm of air is flowing through the small space. This is preferable to a spray type humidifier because no minerals are brought into the main air stream that is circulated throughout the house. Furthermore it does not require any special fan or any cleaning of the type required by a belt humidifier. There would be an extremely small build up of minerals in the tank 19 if there were a significant mineral content in the water. However, the total evaporation of water during the humidification might amount to as much as a gallon a day, and thus it would obviously take a very long time to evaporate the 6,000 gallons in the tank. Of course, the water would be continuously replaced in order not to diminish the water level in the tank 19, but even after 6,000 gallons had been evaporated and replaced by a fresh supply, the mineral content would only be doubled from its normal value. The anti-corrosion material that coats the inner surface of the tank 19 would not be affected by such minerals.

Mode E

This mode is simply a ventilating mode to be used when it is desirable to change the air in the house. In this mode air is drawn in through the louver 51 or louver 108 or both and is drawn through the filter 109 by the fan 47. The damper 49 is in the position shown in FIG. 9 and the damper 48 may be in a horizontal position to allow air to go directly into the duct 34 and on into the house by way of the short ducts 106 and 107.

Both the dampers 102 and 103 would be closed to prevent air from getting to other parts of the air space 21 and inadvertently cooling it or heating it, depending on the temperature of the water in the tank 19. However, the air is being circulated in the venting mode in a very low velocity, and there is virtually no resistence to the flow of this air into the duct 34.

Mode F

This is the cooling mode to be used in the summer. In this mode the fan 47 is in the position shown in FIG. 9, and the water in the lower section 30 of the tank 19 is cooled. The way that the water is cooled will be described later. Air impelled by the blower 47 is directed upwardly by the damper 48, which is in a position 90° away from the position illustrated in FIG. 9. This air goes up the duct 32, past the open damper 103, into the circumferential duct 23, and down along the air space 21. Since the water in section 30 of the tank is cool, the air flowing downwardly through the air space 19 is cooled and comes out at the circumferential duct 22 cooler than it entered the circumferential duct 23. The air leaves the circumferential duct 22 and goes up the duct 33, past the open damper 102, and is deflected into the duct 34 by the damper 38. This cooled air then emerges through the short ducts 106 and 107.

In this mode, air is preferably down into the system from the hottest location, which would be the upper louver 108, although some air could enter by way of the lower louver 51.

There are several things that are a little different in this mode than in the cooling system used in standard houses. For one thing, the water in the tank section 30 is used for sensible cooling only, that is, removing heat that is sensed as heat. Latent heat is removed by a separate dehumidifier 53. This permits the surface of the tank 19 to have a higher temperature than would otherwise be acceptable, because it is not necessary to get any part of the surface of the tank below the dewpoint. In the cooling of air that has been dehumidified, the biggest advantage made possible by this invention is that the heat pump does not have to lower the temperature of the entire lower tank section to the dewpoint, which would be a tremendous waste of power.

Most of the heat removed from the building during the summer is sensible heat, because this is the heat that comes through the walls and roof and is felt as heat by persons inside the building. Latent heat that would otherwise come into the building may, to a great extent, be prevented from doing so by providing a satisfactory vapor barrier consisting of an unbroken sheet of some material such a polyethylene lining the walls. Some latent heat is generated within the building by the use of hot water for showers or baths, or for washing dishes or clothes, or it may be generated simply because people in the house give off latent heat. However, this latent heat still amounts to only a small fraction of the total heat to be removed, usually less than about 20%. If the latent heat were not removed by condensation, any attempt to reduce the sensible heat to a temperature above the dewpoint would give the building a clammy feeling.

The latent heat could be removed by causing some or all of the surface of the tank 19 at the bottom section 30 of the tank to drop below the dewpoint, but this would require the expenditure of a lot of energy to get the tank surface temperature to that level, much more energy than is required simply to dehumidify the air by a dehumidifier 53 as the air passes through the duct 36. The dehumidifier 53 has only a relatively small surface area that must be dropped below the dewpoint.

Although dehumidification may be desirable during other modes, it is likely to be most desirable during the cooling mode. The dehumidifier 53 is installed as part of the wall of the duct 36 near the louver 108 at which most of the air is brought in during the cooling mode. The compressor 110, condenser 112 and evaporator 113 operate to lower the temperature of the evaporator below the dewpoint. The surface area of the evaporator is much smaller than the surface area of the tank section 30, and it requires little power to cool it below the dewpoint. Air blown across the evaporator surface by the fan 111 cools sufficiently to condense out the moisture. This air then passes across the surface of the condenser which heats the now-dry air back up. The air blown out of the lower part of the dehumidifier travels on down the duct 36 and is replaced by air that contains moisture and enters the dehumidifier 53 from the upper part of the duct 36 by way of the open area at the upper part of the dehumidifier.

During the cooling of air, the temperature of air brought to the living space of the building from the circumferential duct 23 by the flow produced by the fan 47 may be approximately 80° F. This would be drawn from the highest temperature location in the living space, and 80° F. is an acceptable temperature in the summertime if the air is dry.

It is reasonable to assume that there is a 10° F. temperature difference between the air temperature and the water temperature in the tank section 30. Thus, the water temperature at the top part of section 30 would be about 70° F. As the air being cooled travels down the air space 21 along the tank section 30, its temperature is reduced about 20° F. This is equivalent to about three tons of airconditioning. The 20° reduction causes the air at the lower circumferential duct 22 to have a temperature of about 60° F. as it is gathered by that duct and transferred to the duct 33 and on out by way of the short ducts 106 and 107. This assumes that the temperature of the water in the lowest part of the section 30 is approximately 50° F. The average temperature in section 30 is one-half of the sum of the 70° temperature at the top of section 30 and the 50° temperature at the bottom, or 60° F.

In Mode F, it will be assumed that the water in the lower section 30 of the tank 19 is cooled by the operation of the heat pump consisting of the compressor 131, the condenser section 50 and 120, and the evaporator 137 immersed in the upper part of section 30 of the tank. The pumping operation is such that the evaporator 137 has to cool the water down to 50° F. even though the average temperature in the water in section 30 is 60° F. Even the 50° F. temperature produced by the evaporator 137 is still above the dewpoint and is quite a bit higher than the temperature found in the evaporator of standard home airconditioning apparatus. As the water is cooled in the evaporator 137, its density increases and it sinks out of the open bottom of the evaporator and is replaced by less dense water that enters through the opening 138 at the top of the evaporator. The cooled water sinks to whatever level corresponds to its temperature. In doing so, it may be heated by water at intermediate levels. If the cooling continued indefinitely, the entire tank would reach the temperature of 50° F., but before the entire tank reaches this temperature, the fan 47 is likely to be turned on by a thermostat to circulate cooled air through the house.

The air flowing through the air space 21 from the duct 23 to the duct 22 creates a temperature gradient in the water in the tank section 31. The highest temperature water is at the top since it receives heat from the highest temperature recirculated air. This is the correct relationship between air flow and water temperature gradient to achieve optimum operation. The direction of air flow during the cooling mode is opposite the direction of air flow during heating Modes A or B.

Operation of Heat Pump during Cooling Mode F

By virtue of the storage capacity of the tank section 30, it is possible to limit the operation of the heat pump only to night time operation in Mode F. The heat taken from this section at B 50° F. is carried to the condenser sections 52 and 120 at night where air passing over the condenser may typically be about 70° F. Thus the temperature differential between the air temperature and the temperature of the water being cooled is about 20° F. There are, of course, additional temperature differentials such as that between the water and the coil 60 in the evaporator 137 and between the air and the condenser 52 and 120, but these other differentials are relatively negligible compared to the 20° differential between the water and the outside air.

A typical air conditioner for a standard house will normally operate during the heat of the day when the outside air may be 90° F. to 100° F. The typical air conditioner is forced to cool this air down to about approximately 40° F. on the evaporator side of the system in order to remove latent heat, which means that there is a differential of about 50° F. between the outside air temperature and the temperature to which the air is cooled by the air conditioner. This is in contrast to the present system which has only the 20° temperature differential just described. Furthermore, the transfer of heat by the heat pump in the present system occurs at night so that, in many areas, it is possible to take advantage of off-peak power rates. Not all power companies provide such rates, but, in theory, it is something that is cost effective for power companies to do. Even without the off-peak rates, the fact that the heat is pumped for air conditioning purposes in the system of the present invention against a 20° F. temperature difference whereas heat is pumped by a normal air conditioner against approximately a 50° F. temperature differential means that the system of the present invention will be more than twice as efficient in the transfer of heat as a standard system.

The air that transfers heat from the heat pump out of the building does not pass through both sections 52 and 120 of the heat pump condenser in series. In Mode F, the damper 118 is closed and the damper 119 is open. Air is brought down through the opening defined by the open damper 125 and into the duct 36. The damper 130 would be closed, and so the air would go into the ducts 42 and 41 near the damper 119. Part of this air would pass through section 52 and the remainder through section 120 of the heat pump condenser to remove heat from the condenser and would be blown up through the louver 127, which is open. Although the damper 125 and the louver 127 are close together, they direct the air so that there is negligible recirculation of air from the louver 127 back into the damper 125. Furthermore, these components are at the peak of the roof where there is most likely to be a natural breeze anyway.

The system for obtaining solar heat and storing it in the tank 19 has already been described, particularly in connection with FIGS. 7 and 17. In case of a prolonged period of extremely cold weather and heavy clouds, the temperature in the tank section 30 may drop below the level at which it can be used, and even the temperature in the upper section 31 may drop to the point where it is undesirable to use any more lest the temperature of the domestic hot water be reduced to too low a value. If it is undesirable to supply heat to the tank 19 by use of the fireplace 16, the heat pump described in connection with Mode F, the cooling mode, can be used. The heat pump does not heat water in the tank; in fact, it removes heat from the water in the tank. It uses the heat from the tank to heat, directly, the air in the ducts.

Although the heat pump can theoretically draw heat from the water in the tank 19 right down to the point at which the water freezes, such excessive cooling of the water would never be allowed, and it would be mandatory, if the necessity of supplying heat reached such an extreme state, to use an immersion heater in the upper tank section 31 or to use the fireplace 16 or the incinerator whether it was convenient to so or not. It should be reiterated that the conditions causing such extreme depletion of the heat supply would be most severe and unusual. Without carrying the water temperature down to the freezing point, but only down to a temperature of about 40° F. to 50° F., it would still be possible to obtain several days of operation with sufficient heat in the house without the necessity of using an immersion heater or any outside source other than the electricity to drive the heat pump. This electricity is by no means comparable to the amount that would be required for a direct electrical heater.

The operation of the heat pump, that is cooling the evaporator 137, or more particularly the coil 60 within the hollow plastic cylinder that is the outside component of the evaporator, and transferring that heat ot the condenser sections 52 and 120 is exactly the same whether the heat in the condenser sections is blown outdoors, as in Mode F, or is used to heat air that passes through the sections 52 and 120 in succession as described in connection with the heat pump mode of operation, Mode D. In Mode D, air entering the duct 42 through the open damper 130 is forced by the closed damper 119 to flow through the condenser sections 120 and 52 in succession and then past the open damper 118 in the duct 41 to the duct 40 and thense down the duct 35. The pumped heat is picked up as the air passes through the condensor sections.

One advantage of using the heat pump is that the operation of the solar panels becomes extremely efficient once the sun comes out again. This is because, with the water in section 30 of the tank at the assumed temperature of 50° F., there would be a temperature differential of only about 20° F. between the 50° F. value and an outside air temperature of 30° F., which is a normal average daytime temperature in New England in the wintertime. With a low differential of only 20° F., the operating efficiency of the panels 11 would be approximately 70%. This efficiency falls off as the water temperature gets higher and is likely to be down around 30% if there is a 100° F. differential between the temperature in the tank section 30 and the ambient outside temperature. To obtain an efficiency even as high as 30% under such conditions would require the use of double-glazed solar panels, such as the panels 82 in FIG. 7. The efficiency for a single-glazed panel would be around 15% with a 100° F. temperature differential. However, the panels 11 will rarely operate with a 100° F. temperature differential because the temperature is the lower section 30 does not have to be that high.

The panels 82 do operate at a high temperature differential between the water in the panels and the air temperature outside. That high differential is the reason for double glazing the panels 82. In a mild climate there would be a lower differential, even in the winter, and double glazing would then be neither necessary nor desirable. It would not be desirable because every supposedly transparent or translucent layer of glass or plastic absorbs a small fraction of the radiation striking it and thereby reduces the intensity of radiation that can strike the water passages.

The flow through the panels 11 and 82 can be controlled to achieve any desired distribution of heat from them. One extreme is to arrange the valving 165a described in connection with FIG. 7 so that no water flows through the panels 82 but all of the water passing through the panels 11 is forced to flow directly through the pipe 83 to the tank section 30. At the other extreme, none of the water flows through the pipe 83 but all of it passes through the connection 165 to the panels 82 to receive additional heat before returning to the upper tank section 31 via the pipe 99. Any intermediate division between these two extremes can also be obtained. Moreover, the pumps 88 and 92 shown in FIG. 7 can be controlled to supply any relative amounts of water to whichever set of panels 11 or 82 or both was selected even if the sets of panels are not joined together by the connection 165. Whether the panels 11 and 82 are connected together or are entirely separated, the pumping rates of water through them can be controlled so that the irradiated water is heated to the proper temperature to be returned to the tank sections 30 and 31. For efficient heat transfer it is important that the temperature of the water returned to either tank section 30 or 31 be no cooler than the water adjacent the outlet ends of the pipes 83 or 99. This is important even though water returned at a lower temperature but still higher than the temperature at the bottom of the section 30 would add heat to the system.

A condensed statement of instructions of the positions of the fan 47 and the dampers and louvers for the Modes A-F is given in Table I. The letter H stands for horizontal, V for vertical, O for open, C for closed, N for normal (the position shown in solid lines in FIG. 9), and P for perpendicular (the position perpendicular to the normal position shown in FIG. 9).

Table I

| Ref. No. | Mode A | Mode B | Mode C | Mode D | Mode E | Mode F |
|---|---|---|---|---|---|---|
| 47  | H | H | H | V   | H | H |
| 48  | N | N | P | Any | H | P |
| 49  | N | N | N | P   | N | N |
| 51  | O | O | O | O   | C | C |
| 102 | O | O | C | C   | C | O |
| 103 | O | C | O | C   | C | O |
| 104 | C | O | O | O   | C | C |

Table I-continued

| Ref. No. | Mode A | Mode B | Mode C | Mode D | Mode E | Mode F |
|---|---|---|---|---|---|---|
| 108 | C   | C   | C   | C   | C | O |
| 116 | O/C | O/C | O/C | O/C | C | C |
| 117 | O/C | O/C | O/C | O/C | C | C |
| 118 | C   | C   | C   | O   | C | C |
| 119 | C   | C   | C   | C   | C | O |
| 125 | C   | C   | C   | C   | O | O |
| 127 | C   | C   | C   | C   | O | O |
| 130 | O/C | O/C | O/C | O   | O | C |

FIG. 18 is a graph of heat transfer to the living space in the house as a function of mean storage temperature of the water for all of the modes except Mode E, the ventillating mode. In Mode A the heat measured in BTU/HR decreases linearly as the mean temperature of water in the tank 19 decreases, as indicated by the straight line labeled Mode A and B.

When the available BTU/HR drops too low, the dampers are switched to Mode B according to Table I. At that point, somewhere to the left of the 90° F. point, the circulated air would begin to pick up heat from the upper tank section 31. However the mean temperature in the lower section 30 would continue to decrease. The heat picked up from the upper section 31, alone, in Mode B would also decrease as the temperature of that section decreased. The line identified as Mode B represents the heat obtained from the upper tank section 31 as the contribution from section 30 continues to decrease. The line marked Mode B and the line marked Mode C are calculated for the minimum acceptable mean water temperature in section 31 required to provide usefully hot domestic hot water from the tank 61. During Mode B the quantities of heat represented by the lines marked Mode B and Mode A and B are added point by point to indicate the total quantity available at any temperature.

In Mode C, since the water temperature in section 31 is considered to be the lowest acceptable and the air temperature in the living space is also constant, the heat transferred is constant.

The heat transferred by the heat pump in Mode D tends toward a constant value when the water temperature is relatively high and there is less need for heat but also tends toward a lower constant value as the water temperature drops below about 50° F. and there is less heat available.

Mode F depends on the transfer of heat across the wall of the tank section 30, the same as Mode A but in the opposite direction. Therefore, the slope of the line marked Mode F is the same as the slope of the line marked Mode A and B, except that the slope of the line for Mode F has a negative value. These two lines would meet at the level of O BTU/HR if the graph extended down that far.

The core 14 need not include the heat pump if it is to be installed in a house in a region of moderate climate not likely to have extremes of heat and cold that require air conditioning or the use of Mode D. The fireplace 16, the dehumidifier 53, and the pressure tank 62 may also be eliminated. This would be particularly likely in the case of cores that are to provide solar heat storage for houses already in existence. Such cores can be installed in added-on structures just outside the existing houses. However, each of the components referred to has its value, which would be lost if the components were omitted. In any event, the core 14 is of a size that permits it to be shipped easily. This makes it possible to assemble the core, including some or all of the components that could be omitted, in a factory. This has the advantage of assembly under much better conditions than normally exist when such components are installed during the construction of a house. Plumbing and electrical wiring parts are cut to length and installed on a mass production basis, at least as compared with the one-at-a-time cutting, assembling, and connecting of such parts in a house, even in relatively similar houses in a housing development. It is easier to test plumbing for leakage and electrical wiring for short circuits or open circuits in a factory than to make such tests during the construction of a house. Alignment of ducts, dampers, etc. is easier to do with mass production parts in a factory than in a house. And mass purchases of such components as the heat pump and dehumidifier make possible additional cost savings.

This invention has been described as being installed in a house. It should be understood that a core 14 or any number of cores can be used in commercial buildings such as apartment houses, stores, shopping centers, factories, and numerous other sturctures as well as private houses.

The specific sizes, temperatures, costs and other factors included in this description have been for the purpose of clarifying the description and are not to be considered as limiting the scope of the invention. For example, the height of the core 14 need not be more than two stories if the core is to be installed in a house that is not to have a basement. The lower part of the tank section 30 that is shown in the drawings as resting on the basement floor could be omitted, reducing the total tank volume to about 4,000 gallons. Such reduction in capacity would be more feasible for houses built in a mild climate than a severly cold or hot climate.

What is claimed is:

1. The combination comprising: a hollow upright tank adapted to contain water; a heat insulative barrier dividing the tank into an upper tank section and a lower tank section; an intermediate circumferential hollow duct encompassing the tank in the general area of the barrier; an upper circumferential hollow duct encompassing the upper tank section and located spacedly from and upwardly of the intermediate circumferential duct; a lower circumferential hollow duct encompassing the lower tank section and located spacedly from and downwardly of the intermediate circumferential duct; an upper enclosure of heat insulative material, encompassing the upper tank section and spaced therefrom between the intermediate and upper circumferential ducts, defining an upper air channel that is in communication with the intermediate and upper circumferential ducts; a lower enclosure of heat insulative material, encompassing the lower tank section and spaced therefrom between the intermediate and lower circumferential ducts, defining a lower air channel that is in communication with the intermediate and lower circumferential ducts; a duct system in communication with all of the circumferential ducts so constituted as to provide air communication from the exterior space outside of the tank; force applying means for forcing air through the duct system, the circumferential ducts and the air channels; and selector means so adjusting the force applying means and/or the duct system as to selectively force the air from said space through a selected circumferential duct, then through a selected air channel, and then through a different selected circumferential duct back to said space, the flow of the air through the selected air channel enabling a heat transfer to take place between the water in the tank section encompassed by the selected air channel and the air flowing through the selected air channel.

2. The combination of claim 1 further comprising: heat conductive spacer means attached to the outer wall of each tank section and extending outwardly therefrom to engage the inwardly facing surface of its associated enclosure.

3. The combination of claim 2 in which each enclosure comprises a layer of insulating material would around its associated spacer means and resting on the outer parts of its associated spacer means.

4. The combination of claim 3 in which the tank is generally cylindrical and the spacer means comprises a plurality of elongated heat conductive fins attached to the outer, generally cylindrical surface of the tank.

5. The combination of claim 1 comprising, in addition, a rigid support floor mounting the tank.

6. The combination of claim 1 further comprising: a hot water tank suspended in the upper tank section.

7. The combination of claim 1 wherein the duct system comprises: elongated hollow air duct means so attached to said tank as to be in substantially air tight communication with all of said circumferential ducts; and air distribution duct means communicating with said space and in substantially air tight communication with said elongated duct means.

8. The combination of claim 7 wherein said elongated duct means comprises: a first elongated duct in communication with a first of the circumferential ducts; and a second elongated duct in communication with a second of the circumferential ducts; said first and second elongated ducts being in communication with each other at a juncture; wherein said force applying means comprises a fan; and wherein said selector means comprises: means so mounting the fan at the juncture as to selectively force air through the first or the second elongated duct; and wherein said duct system further comprises: an air inlet in communication with said juncture.

9. The combination of claim 1 further comprising: a first pipe extending into the tank from its top and terminating at its lower end near the bottom of the lower tank section; a second pipe extending into the tank from its top and terminating at its lower end just below said barrier; a third pipe extending into the tank from its top and terminating at its lower end just above the barrier; a fourth pipe extending into the tank from its top and terminating at its lower end above the lower end of the third pipe; means for circulating relatively low temperature water into the lower tank section through the first and second pipes; and means for circulating relatively high temperature water into the upper tank section through the third and fourth pipes.

10. The combination of claim 9 wherein said means for circulating the low temperature water comprises: first solar panel means including a first water channel in communication with said first and second pipes; first pumping means for forcing water from the first pipe through the first channel to the second pipe; second solar panel means including a second water channel in communication with said third and fourth pipes; second pumping means for forcing water from the third pipe through the second channel to the fourth pipe; and means so constructing the solar panel means as to cause the first solar panel means to heat water to a lower temperature than the second solar panel means.

11. The combination of claim 10 further comprising: a connection between said second and third pipes; and a valve at the juncture of the second pipe and the connection so constructed as to control the amount of water flowing from the second pipe through the connection into the third pipe.

12. The combination of claim 1 further comprising: a combustion structure mechanically attached to the tank and comprising an elongated chimney extending substantially parallel to said tank; and a heat exchanger comprising a coil of hollow metal tubing having a coil axis substantially parallel to the direction of elongation of the chimney, said coil being mounted near the upper end of the chimney and being connected to exchange fluid with the tank.

13. The combination of claim 1 further comprising: a compressor and a condenser connected thereto, the compressor and the condenser being mechanically mounted at one end of the tank; and an evaporator physically suspended within the tank so as to be immersed in the water contained in the tank; the evaporator being so connected to the condenser and the compressor as to form therewith a heat pump to remove heat from the water contained in the tank.

* * * * *